(12) United States Patent
Fujii et al.

(10) Patent No.: US 11,650,557 B2
(45) Date of Patent: May 16, 2023

(54) LEARNING APPARATUS, LEARNING METHOD, COMPUTER READABLE MEDIUM HAVING RECORDED THEREON LEARNING PROGRAM, DETERMINATION APPARATUS, DETERMINATION METHOD, AND COMPUTER READABLE MEDIUM HAVING RECORDED THEREON DETERMINATION PROGRAM

(71) Applicant: YOKOGAWA ELECTRIC CORPORATION, Tokyo (JP)

(72) Inventors: Ryohei Fujii, Tokyo (JP); Yanyan Lin, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 155 days.

(21) Appl. No.: 17/144,063

(22) Filed: Jan. 7, 2021

(65) Prior Publication Data
US 2021/0240177 A1     Aug. 5, 2021

(30) Foreign Application Priority Data
Jan. 31, 2020   (JP) .............................. JP2020-014710

(51) Int. Cl.
*G05B 23/02*   (2006.01)
*G06N 20/10*   (2019.01)
*G06K 9/62*    (2022.01)

(52) U.S. Cl.
CPC ....... *G05B 23/0232* (2013.01); *G06K 9/6257* (2013.01); *G06N 20/10* (2019.01); *G05B 23/0272* (2013.01)

(58) Field of Classification Search
CPC .......................... G05B 23/0232; G06N 20/10
USPC ........................................................ 702/183
See application file for complete search history.

(56) References Cited

U.S. PATENT DOCUMENTS

| 2019/0188584 A1 | 6/2019 | Rao | |
| 2019/0325328 A1* | 10/2019 | Katz | ....................... G06F 17/14 |
| 2020/0012900 A1* | 1/2020 | Walters | ................... G06F 9/547 |
| 2020/0225644 A1 | 7/2020 | Shizuka | |

(Continued)

FOREIGN PATENT DOCUMENTS

| JP | 55612591 A | 2/1981 |
| JP | 2017033526 A | 2/2017 |

(Continued)

OTHER PUBLICATIONS

Extended European Search Report for European Patent Application No. 21153436.7, issued by the European Patent Office dated Jun. 28, 2021.

(Continued)

*Primary Examiner* — Ricky Go

(57) ABSTRACT

A learning apparatus is provided, which comprises: a learning data acquiring unit for acquiring learning data including measurement data obtained by measuring a facility and a state of the facility; a learning pre-processing unit for performing a pre-processing for reducing a drift of the measurement data in the learning data and outputting pre-processed learning data; and a learning processing unit for performing a processing for learning a model for determining the state of the facility from the pre-processed measurement data, by using the pre-processed learning data.

17 Claims, 7 Drawing Sheets

(56) References Cited

U.S. PATENT DOCUMENTS

| | | | | |
|---|---|---|---|---|
| 2020/0342310 A1* | 10/2020 | Farchi | ................... | G06N 20/10 |
| 2021/0042570 A1* | 2/2021 | Iskandar | .............. | G06K 9/6228 |
| 2021/0158085 A1* | 5/2021 | Budzik | ................. | G06N 20/00 |
| 2021/0216901 A1 | 7/2021 | Takano | | |

FOREIGN PATENT DOCUMENTS

| | | | |
|---|---|---|---|
| JP | 2019082918 A | 5/2019 |
| JP | 2019153045 A | 9/2019 |
| WO | 2019229977 A1 | 12/2019 |

OTHER PUBLICATIONS

Yusuke Sakamoto et al., "Initial Experiment for Detecting Concept Drift in Adaptive Monitoring System," The Japanese Society for Artificial Intelligence Document, SIG-KBS-B401-05, Japan, Jul. 24, 2014.pp. 26-33.

Office Action issued for counterpart Japanese Application No. 2020-014710, issued by the Japanese Patent Office dated Dec. 20, 2022 (drafted on Dec. 9, 2022).

\* cited by examiner

LEARNING APPARATUS, LEARNING METHOD, COMPUTER READABLE MEDIUM HAVING RECORDED THEREON LEARNING PROGRAM, DETERMINATION APPARATUS, DETERMINATION METHOD, AND COMPUTER READABLE MEDIUM HAVING RECORDED THEREON DETERMINATION PROGRAM

The contents of the following Japanese patent application (s) are incorporated herein by reference:
No. 2020-014710 filed in JP on Jan. 31, 2020.

BACKGROUND

1. Technical Field

The present invention relates to a learning apparatus, a learning method, a computer readable medium having recorded thereon a learning program, a determination apparatus, a determination method, and a computer readable medium having recorded thereon a determination program.

2. Related Art

In recent years, among other control systems for a plant, there is a control system that has a function of monitoring and diagnosing a facility of the plant by using a learned model. For example, Non-Patent Document 1 discloses a technique of detecting a concept drift when a failure or degradation of a target to be monitored that has never happened before happens and performing a model update at an appropriate timing.

PRIOR ART DOCUMENT

Patent Document

[Non-Patent Document 1] Sakamoto and four others, "Initial Experiment for Detecting Concept Drift in Adaptive Monitoring System," The Japanese Society for Artificial Intelligence Document, SIG-KBS-B401-05, Japan, Jul. 24, 2014.

Generally, because a model used for a diagnosis is educated by using learning data, such model is dependent on the situation, the condition and the setting of devices or the like in which the learning data is acquired, and is difficult to be applied to a diagnosis in another situation or the like. Therefore, in the above described conventional technique, it is required to sense a drift phenomenon in which a feature of target data to be measured changes with the lapse of time and, when the drift is sensed, to update the model.

SUMMARY

In order to solve the above described problem, a first aspect of the present invention provides a learning apparatus. The learning apparatus may include a learning data acquiring unit for acquiring learning data including measurement data obtained by measuring a facility and a state of the facility. The learning apparatus may include a learning pre-processing unit for performing a pre-processing for reducing a drift of the measurement data in the learning data and outputting pre-processed learning data. The learning apparatus may include a learning processing unit for performing a processing for learning a model for determining the state of the facility from the pre-processed measurement data, by using the pre-processed learning data.

A second aspect of the present invention provides a learning method. The learning method includes, by a learning apparatus, acquiring learning data including measurement data obtained by measuring a facility and a state of the facility. The learning method includes, by the learning apparatus, performing a pre-processing for reducing a drift of the measurement data in the learning data and outputting pre-processed learning data. The learning method includes, by the learning apparatus, performing a processing for learning a model for determining the state of the facility from the pre-processed measurement data, by using the pre-processed learning data.

A third aspect of the present invention provides a computer readable medium having recorded thereon a learning program to be executed by a computer. The learning program may cause the computer to function as a learning data acquiring unit for acquiring learning data including measurement data obtained by measuring a facility and a state of the facility. The learning program may cause the computer to function as a learning pre-processing unit for performing a pre-processing for reducing a drift of the measurement data in the learning data and outputting pre-processed learning data. The learning program may cause the computer to function as a learning processing unit for performing a processing for learning a model for determining the state of the facility from the pre-processed measurement data, by using the pre-processed learning data.

A fourth aspect of the present invention provides a determination apparatus. The determination apparatus may include a determination data acquiring unit for acquiring determination data including measurement data obtained by measuring a facility. The determination apparatus may include a determination pre-processing unit for performing a pre-processing for reducing a drift of the determination data and outputting pre-processed determination data. The determination apparatus may include a determining unit for determining a state of the facility from the pre-processed determination data, by using a model learned by using pre-processed learning data obtained by performing a pre-processing on learning data.

A fifth aspect of the present invention provides a determination method. The determination method may include, by a determination apparatus, acquiring determination data including measurement data obtained by measuring a facility. The determination method may include, by the determination apparatus, performing a pre-processing for reducing a drift of the determination data and outputting pre-processed determination data. The determination method may include, by the determination apparatus, determining a state of the facility from the pre-processed determination data, by using a model learned by using pre-processed learning data obtained by performing a pre-processing on learning data.

A sixth aspect of the present invention provides a computer readable medium having recorded thereon a determination program to be executed by a computer. The determination program may cause the computer to function as a determination data acquiring unit for acquiring determination data including measurement data obtained by measuring a facility. The determination program may cause the computer to function as a determination pre-processing unit for performing a pre-processing for reducing a drift of the determination data. The determination program may cause the computer to function as a determining unit for determining a state of the facility from the pre-processed determination data, by using a model learned by using pre-processed learning data obtained by performing a pre-processing on learning data.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention is described through the embodiments of the invention. However, the embodiments described below do not limit the invention defined in the claims. Also, all combinations of features described in the embodiments are not necessarily essential to solutions of the invention.

Figure 1:
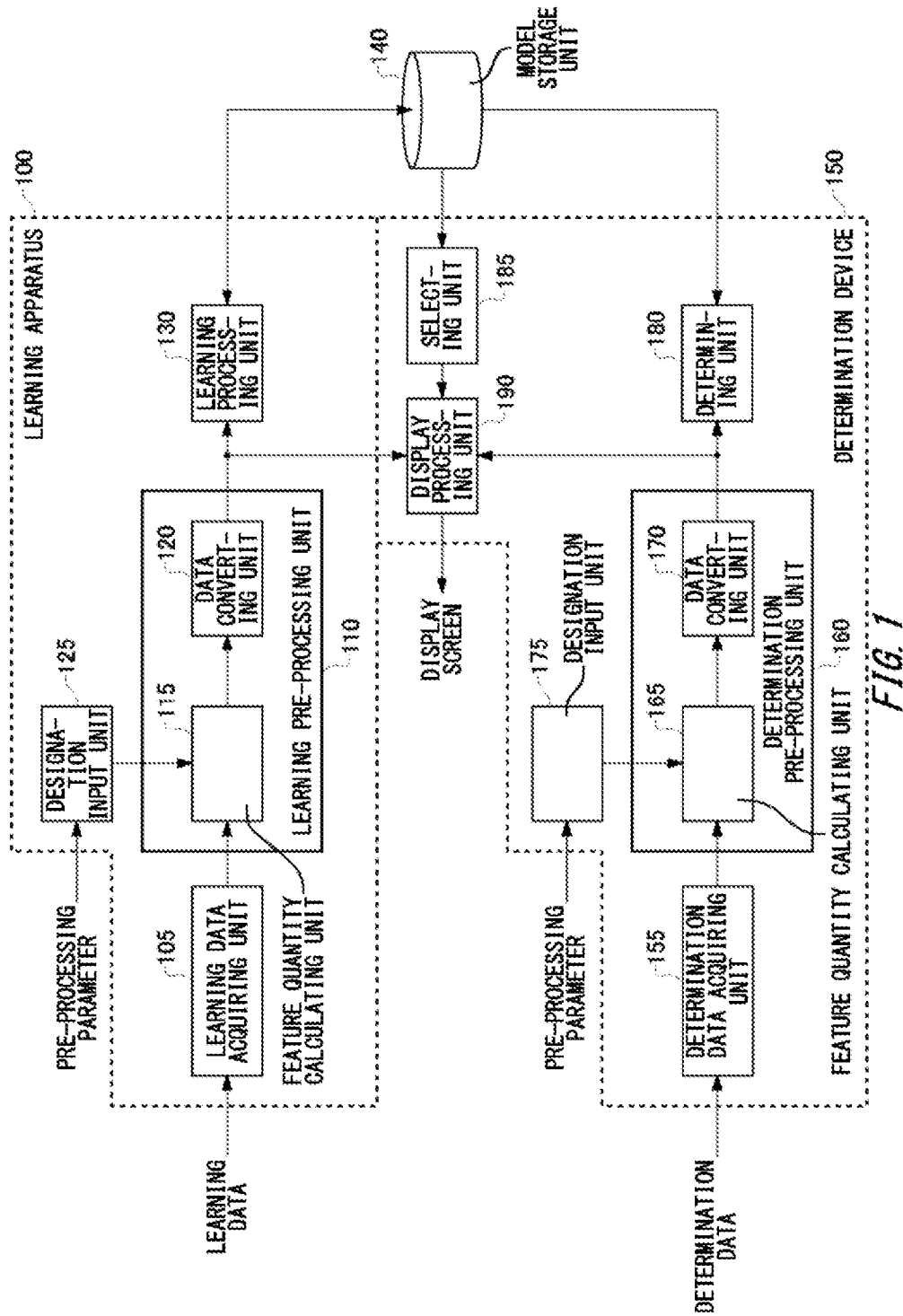
FIG. 1 shows a configuration of a learning apparatus 100 and a determination apparatus 150 according to an embodiment of the present invention.

FIG. 1 shows a configuration of a learning apparatus 100 and a determination apparatus 150 according to the present embodiment. The learning apparatus 100 is configured to learn a model for determining a state of a facility in a plant by using learning data from which an influence of a drift is reduced or removed by a pre-processing. The determination apparatus 150 is configured to determine the state of the facility in the plant or the like based on determination data from which an influence of a drift is reduced or removed by a pre-processing, by using the learned model. In this manner, by performing learning and determination while reducing or removing the influence of the drift, the learning apparatus 100 and the determination apparatus 150 can minimize the need of learning the model again even when a drift occurs in the measurement data, and reduce the processing load of re-learning.

Herein, such plant includes, besides an industrial plant such as a chemical plant or a bio plant, a plant for managing and controlling a wellhead or its surrounding area of a gas field, an oil field or the like, a plant for managing and controlling power generation such as hydraulic power generation, thermal power generation and nuclear power generation, a plant for managing and controlling energy harvesting such as solar photovoltaic generation, wind power generation or the like, and a plant for managing and controlling water and sewerage, a dam or the like. Further, such facility includes a tank, a pipe, a valve, a boiler, a compressor, a motor, and other apparatuses, etc.

Note that the learning apparatus 100 and the determination apparatus 150 can be applied to a facility installed in anywhere other than a plant. For example, the learning apparatus 100 and the determination apparatus 150 may be applied to a facility for controlling air conditioning of a building to realize energy saving or comfortability, or the like. In the present embodiment, an example is shown where the learning apparatus 100 and the determination apparatus 150 are applied to a facility in a plant.

The learning apparatus 100 includes a learning data acquiring unit 105, a learning pre-processing unit 110, and a learning processing unit 130. The learning data acquiring unit 105 is configured to acquire learning data. The learning data includes measurement data obtained by measuring the facility in the plant, and a state of the facility according to the measurement data. Herein, the measurement data include measurement values measured by one or plurality of sensors provided in one or plurality of facilities in the plant for each measurement timing. For example, such measurement data may be data indicating a temperature, pressure, a flow rate, a vibration, corrosion, or the like at a measurement target point of the facility. The state of the facility represents a presence or absence of an anomaly or failure of the facility or the like, and may be a labeling (annotation) that a user such as a maintenance personnel of the plant applied to the measurement data as one example.

The learning pre-processing unit 110 is connected to the learning data acquiring unit 105, and is configured to perform a pre-processing for reducing a drift of the measurement data in the learning data acquired by the learning data acquiring unit 105 and output pre-processed learning data obtained by the pre-processing. The learning pre-processing unit 110 includes a feature quantity calculating unit 115 and the data converting unit 120. The feature quantity calculating unit 115 is configured to calculate a feature quantity of the measurement data in the learning data acquired by the learning data acquiring unit 105. For example, the feature quantity calculating unit 115 is configured to calculate the feature quantity representing a drift of the measurement data in the learning data. The data converting unit 120 is connected to the feature quantity calculating unit 115, and is configured to reduce (that is, at least partly remove) the drift of the measurement data in the learning data or remove the drift of the measurement data. Herein, as for the drift according to the feature quantity calculated by the feature quantity calculating unit 115, the data converting unit 120 may remove the drift according to the feature quantity from the measurement data in the learning data.

The learning processing unit 130 is connected to the learning pre-processing unit 110. The learning processing unit 130 is configured to perform a processing for learning a model for determining the state of the facility from the pre-processed measurement data, by using the pre-processed learning data pre-processed by the learning pre-processing unit 110. The learning processing unit 130 is configured to store the learned model in the model storage unit 140.

The learning apparatus 100 may include a designation input unit 125. The designation input unit 125 is configured to input, from the user of the learning apparatus 100, a pre-processing parameter such as a designation of the type of pre-processing that the learning pre-processing unit 110 should apply to the measurement data in the learning data. When the designation of the type of pre-processing or the like is inputted from the user of the learning apparatus 100, the feature quantity calculating unit 115 in the learning pre-processing unit 110 calculates a feature quantity corresponding to the inputted designation, and the data converting unit 120 may perform a pre-processing corresponding to the inputted designation according to the calculated feature quantity.

The model storage unit 140 is connected to the learning apparatus 100, and is configured to store the model learned by the learning processing unit 130.

The determination apparatus 150 includes a determination data acquiring unit 155, a determination pre-processing unit 160, and a determining unit 180. The determination data acquiring unit 155 is configured to acquire determination data. The determination data include measurement data obtained by measuring a facility in a plant by one or plurality of sensors provided in one or plurality of facilities in the plant at each measurement timing.

The determination pre-processing unit 160 is connected to the determination data acquiring unit 155, and is configured to perform a pre-processing for reducing a drift of the determination data acquired by the determination data acquiring unit 155 and output pre-processed determination data. The determination pre-processing unit 160 includes a feature quantity calculating unit 165 and a data converting unit 170. The feature quantity calculating unit 165 is configured to calculate a feature quantity of the measurement data acquired by the determination data acquiring unit 155. For example, the feature quantity calculating unit 165 is configured to calculate a feature quantity representing a drift of the measurement data in the determination data. The feature quantity calculating unit 165 may have a similar function and configuration to the feature quantity calculating unit 115 in the learning pre-processing unit 110. The data converting unit 170 is connected to the feature quantity calculating unit 165, and is configured to reduce (that is, at least partly remove) the drift of the measurement data in the determination data or remove the drift of the measurement data. Herein, as for the drift according to the feature quantity calculated by the feature quantity calculating unit 165, the data converting unit 170 is configured to remove the drift according to the feature quantity from the measurement data in the determination data. The data converting unit 170 may have a similar function and configuration to the data converting unit 120 in the learning pre-processing unit 110.

The determining unit 180 is connected to the model storage unit 140 and the determination pre-processing unit 160. The determining unit 180 is configured to determine a state of the plant from the pre-processed determination data, by using the learned model stored in the model storage unit 140. Herein, the learned model stored in the model storage unit 140 is a model learned by using pre-processed learning data obtained by performing a pre-processing for learning on the learning data.

The determination apparatus 150 may include a designation input unit 175. The designation input unit 175 is configured to input, from the user of the determination apparatus 150, a pre-processing parameter such as a designation of the type of pre-processing that the determination pre-processing unit 160 should apply to the measurement data in the determination data. When the designation of the type of pre-processing or the like is inputted from the user of the determination apparatus 150, the feature quantity calculating unit 165 in the determination pre-processing unit 160 calculates a feature quantity corresponding to the inputted designation, and the data converting unit 170 may perform a pre-processing corresponding to the inputted designation according to the calculated feature quantity.

The determination apparatus 150 may include a selecting unit 185 and a display processing unit 190. The selecting unit 185 is connected to the model storage unit 140. When the measurement data in the learning data and the determination data include measurement values of plurality of sensors provided in one or plurality of facilities in the plant, the selecting unit 185 selects measurement values of at least one sensor having a relatively high degree of contribution to a determination result of the model among the measurement values of the plurality of sensors.

The display processing unit 190 is connected to the data converting unit 120 and the data converting unit 170, and is configured to receive the pre-processed learning data and the pre-processed determination data. Moreover, the display processing unit 190 is connected to the selecting unit 185, and is configured to perform a processing for displaying a distribution of the pre-processed learning data and the pre-processed determination data received from the data converting unit 120 and the data converting unit 170. Herein, the display processing unit 190 may be configured to perform a processing for displaying, in a display screen, a distribution of the measurement values of the at least one sensor selected by the selecting unit 185 among the pre-processed learning data and the pre-processed determination data received from the data converting unit 120 and the data converting unit 170. Note that the display processing unit 190 may include a display unit such as a display for displaying the display screen. Instead, the display processing unit 190 may perform a processing for displaying the display screen to an external display unit.

The learning apparatus 100 and the determination apparatus 150 as described above can implement a learning and a diagnosis from which the influence of the drift of the measurement data is reduced or removed, by performing a learning of a model while reducing or removing the drift of the measurement data at the time of learning, and performing a diagnosis by using the model after reducing or removing the drift of the measurement data also at the time of diagnosis (determination).

Figure 2:
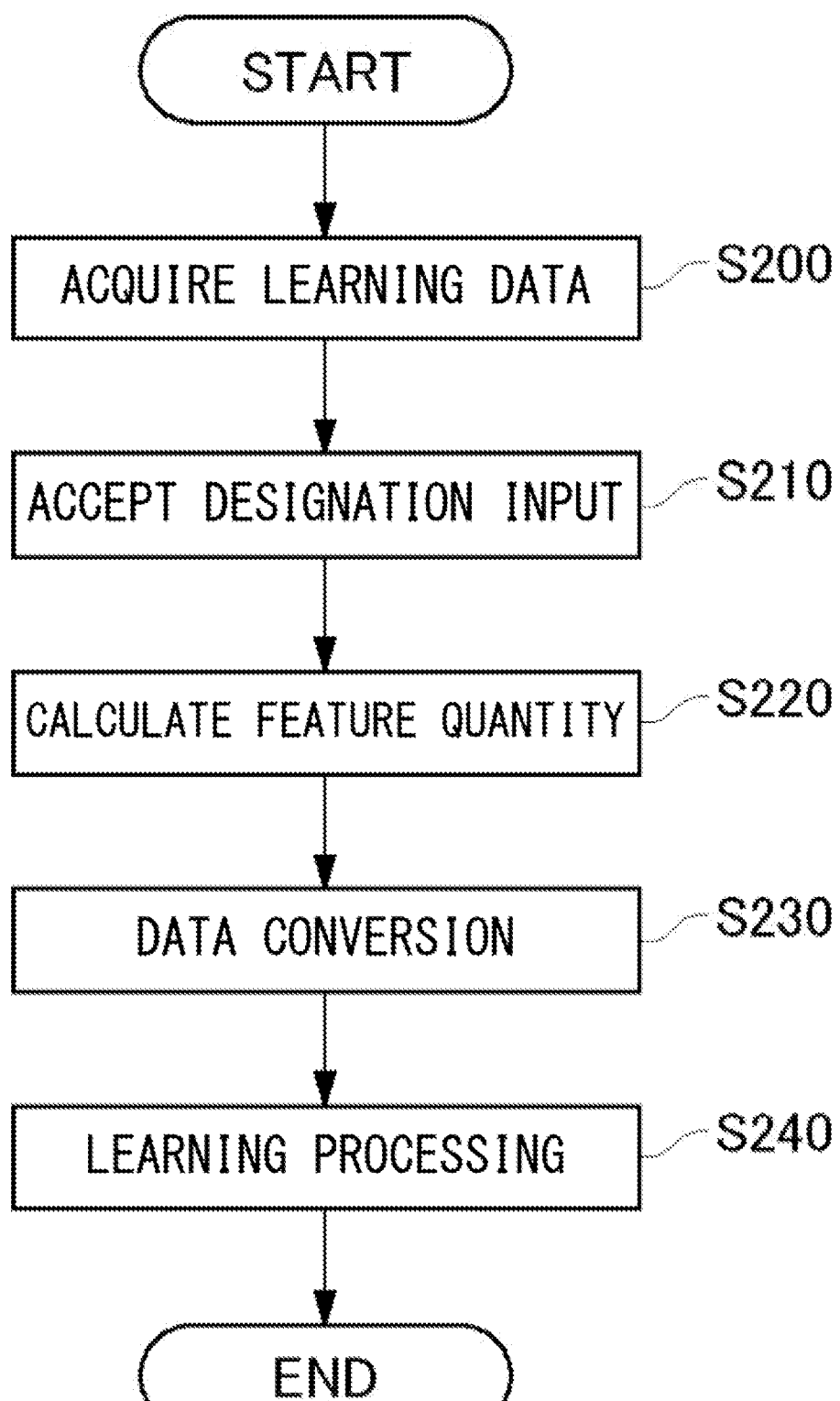
FIG. 2 shows an operation flow of the learning apparatus 100 according to the embodiment of the present invention.

FIG. 2 shows an operation flow of the learning apparatus 100 according to the present embodiment. At S200 (Step 200), the learning data acquiring unit 105 acquires learning data.

At S210, the designation input unit 125 inputs, from a user of the learning apparatus 100, a designation of the type of pre-processing or the like that should be applied to the measurement data in the learning data. Herein, pre-processings that the learning pre-processing unit 110 can apply may include a removal of a gravity center movement, and a removal of the drift by difference calculation within a sliding window, or the like. The designation input unit 125 may input which of such pre-processings as above is to be performed as the designation of the pre-processing parameter such as the type of pre-processing, and may input a parameter associated with the pre-processing, such as the length of the sliding window.

At S220, the feature quantity calculating unit 115 calculates a feature quantity representing a drift of the measurement data in the learning data. Herein, when the type of pre-processing or the like is inputted via the designation input unit 125, the feature quantity calculating unit 115 calculates the feature quantity according to the designated pre-processing and parameter. When the designation such as the type of pre-processing is not inputted, the feature quantity calculating unit 115 calculates the feature quantity according to a default setting.

For example, as for the drift in which an offset is added to the values of the measurement data from the sensor, the feature quantity calculating unit 115 may calculate a mean value of the measurement data for each sliding window during a period of a predetermined length or number of samples. Moreover, as for the measurement data including measurement values from one or plurality of sensors, the feature quantity calculating unit 115 may calculate a gravity center of the measurement data for each sliding window during the period of the predetermined length or number of samples. Herein, when calculating such mean, gravity center, or the like, the feature quantity calculating unit 115 may calculate the mean, the gravity center, or the like by excluding an outlier. For example, the feature quantity calculating unit 115 may consider measurement values to be an outlier, which deviates from the mean of all the measurement values during a target period by a predetermined coefficient such as, for example, three times of the standard deviation or more. Moreover, the feature quantity calculating unit 115 may calculate, as the feature quantity representing the drift of the measurement data, a cycle (for example, every one week) or a timing in or at which the mean, the gravity center, or the like changes.

At S230, the data converting unit 120 performs a pre-processing for reducing the drift of the measurement data in the learning data, and outputs pre-processed learning data. Herein, when the designation of the type of pre-processing or the like is inputted via the designation input unit 125, the data converting unit 120 applies the pre-processing designated by the user to the measurement data. When the designation of the type of pre-processing or the like is not inputted, the data converting unit 120 removes the drift according to the feature quantity calculated at S220. For example, as for the drift with a change of the mean value in the measurement data from a certain sensor, the data converting unit 120 removes an influence of the change of the mean value by subtracting the mean value calculated at S220 from each sample value of the measurement data. Moreover, as for the drift with a movement of the gravity center in the measurement data from a plurality of sensors, the data converting unit 120 removes an influence of the change of the gravity center by subtracting the gravity center calculated at S220 from a set of sample values at each timing of the measurement data. When the type of pre-processing is not designated, the data converting unit 120 may apply a pre-processing prescribed by default. Instead, the data converting unit 120 may determine, based on the feature quantity indicating the cycle or the timing in or at which the mean, the gravity center, or the like changes, which is calculated by the feature quantity calculating unit 115, to use a sliding window having a shorter period than the change and to remove the change of the index (the mean, the gravity center, or the like) that has changed.

Moreover, depending on the type of drift removal, the data converting unit 120 can perform a pre-processing for removing the drift on the measurement data without using the feature quantity calculated by the feature quantity calculating unit 115. A method for such drift removal includes difference calculation within a sliding window, for example. More specifically, when using the difference of the measurement values within the sliding window such as a value obtained by subtracting the minimal value from the maximum value of the measurement values within the sliding window, the first value and the last value of the measurement values within the sliding window, or the largest value of the differences of the adjacent measurement values within the sliding window, the influence of the change of the mean value is removed with this calculation. Therefore, as for such drift removal, the data converting unit 120 is not required to use the feature quantity such as the mean value calculated by the feature quantity calculating unit 115. Note that, even in such case, the data converting unit 120 may determine the size of the sliding window by using the feature quantity indicating the cycle or the timing in or at which the mean or the like changes.

Moreover, the data converting unit 120 may perform a processing for standardizing the size of the measurement data. For example, the data converting unit 120 may standardize the size of the measurement data, by setting a value obtained by dividing the difference between the measurement values and the mean value by the standard deviation as the measurement data after the pre-processing. Thus, the data converting unit 120 can perform an appropriate pre-processing even on a drift in which the sensitivity of the sensor changes.

At S240, the learning processing unit 130 performs a processing for learning a model for determining a state of the facility from the pre-processed measurement data, by using the pre-processed learning data from the learning pre-processing unit 110. As one example, the model inputs one or plurality of measurement values from one or plurality of sensors for each timing of a determination target, and outputs a determination result of the state of the facility according to the one or plurality of measurement values. Herein, the model may use a support vector machine (SVM), a neural network, or another machine learning model.

For example, in a case where the SVM is used, when points having coordinates based on a set of one or plurality of measurement values at each timing in the pre-processed learning data are mapped to a multi-dimensional space, the learning processing unit 130 learns a hyperplane separating a set of points at which the facility is labeled as normal and a set of points at which the facility is labeled as abnormal with the maximum margin. This hyperplane is represented by a weight vector including a set of weight corresponding to each measurement value.

Moreover, for example, in a case where the neural network is used, the learning processing unit 130 adjusts the weight between each neuron and the bias of each neuron by using a method such as backpropagation, so as to minimize the error between the determination result outputted from an output layer when a set of one or plurality of measurement values from one or plurality of sensors included in the pre-processed learning data are inputted to an input layer and a target determination result.

Note that, because it is rare for the facility in the plant to become abnormal, most of the measurement data in the learning data are labeled as being normal and the measurement data labeled as being abnormal are few. To solve the problem of such unbalance, the feature quantity calculating unit 115 may undersample the measurement data labeled as being normal (normal data) and supply the measurement data to the learning processing unit 130 via the data converting unit 120, at S220. That is, for example, the feature quantity calculating unit 115 may reduce the number of samples of the normal data by learning the model using samples selected for each fixed cycle or at random from samples at each timing in the normal data.

Moreover, the feature quantity calculating unit 115 may oversample the measurement data labeled as being abnormal (abnormal data) at S220. That is, for example, the feature quantity calculating unit 115 may increase the number of samples of the abnormal data, by repeatedly using the sample of the abnormal data or by generating a new sample of the abnormal data at random using the mean and the variance of the abnormal data, or the like. Moreover, the feature quantity calculating unit 115 may add a point between the samples of the abnormal data as a new sample at random, by using a method such as SMOTE (Synthetic Minority Oversampling Technique). Moreover, the feature quantity calculating unit 115 may further reduce the unbalance by using the undersampling of the normal data and the oversampling of the abnormal data in combination.

Moreover, the learning processing unit 130 may perform an adjustment to further improve a correct answer rate of the model, by optimizing a hyperparameter of the model (for example, the number of layers, the number of nodes in the neural network, or the like). Moreover, the learning processing unit 130 may learn the model so that each sample of the normal data can be classified in one class, by using a machine learning model that performs one-class classification such as One Class SVM.

Figure 3:
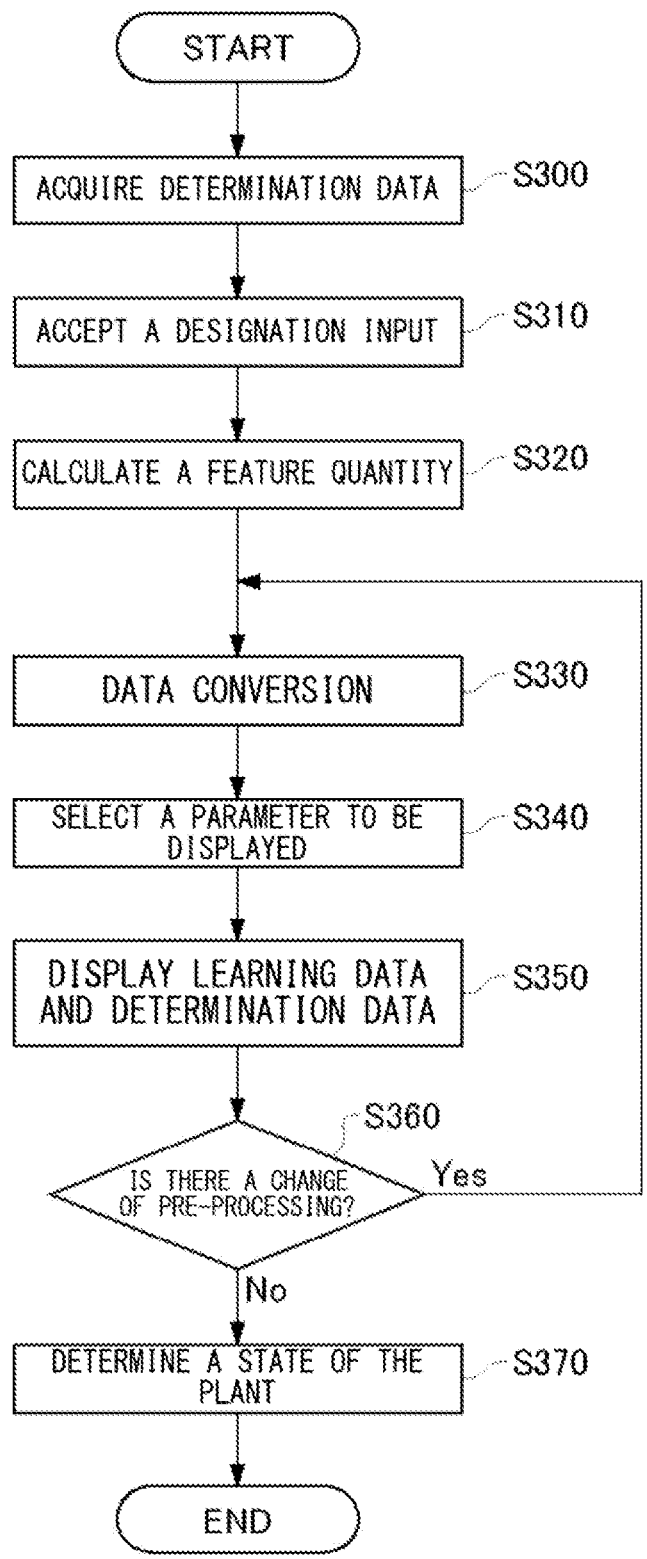
FIG. 3 shows an operation flow of the determination apparatus 150 according to the embodiment of the present invention.

FIG. 3 shows an operation flow of the determination apparatus 150 according to the present embodiment. At S300, the determination data acquiring unit 155 acquires determination data. The determination data acquiring unit 155 may acquire, as the determination data, sensor data provided in real time from one or plurality of sensors provided in one or plurality of facilities in the plant.

At S310, the designation input unit 175 inputs, from the user of the determination apparatus 150, a designation of a pre-processing parameter such as the type of pre-processing that should be applied to the measurement data in the determination data. The designation input unit 175 may input the designation of the pre-processing parameter such as the type of pre-processing, by a similar processing to that of S210 in FIG. 2.

At S320, the feature quantity calculating unit 165 calculates a feature quantity representing a drift of the measurement data in the determination data. The feature quantity calculating unit 165 may calculate the feature quantity, by a similar processing to that of S220 in FIG. 2.

At S330, the data converting unit 170 performs a pre-processing for reducing the drift of the determination data, and outputs pre-processed determination data. The data converting unit 170 may apply the pre-processing to the determination data, by a similar processing to that of S330 in FIG. 2. Note that the feature quantity calculating unit 165 and the data converting unit 170 may apply, to the determination data, the same pre-processing as the pre-processing performed by the feature quantity calculating unit 115 and the data converting unit 120. Instead, the feature quantity calculating unit 165 and the data converting unit 170 may apply, to the determination data, a pre-processing that is at least partly different from the pre-processing performed by the feature quantity calculating unit 115 and the data converting unit 120. For example, when the cycle of the drift is different between the learning data and the determination data, the feature quantity calculating unit 165 and the data converting unit 170 may apply, to the determination data, a pre-processing for reducing the drift in a different cycle from that of the pre-processing performed on the learning data.

At S340, when the measurement data in the determination data include measurement values from a plurality of sensors, the selecting unit 185 selects measurement values of at least one sensor having a relatively high degree of contribution to the determination result of the model as the parameter that should be displayed on the display screen.

At S350, the display processing unit 190 displays, on the display screen, the distribution of the measurement values of the at least one sensor selected at S340 among the measurement values of each sensor included in the pre-processed learning data received from the learning pre-processing unit 110 and the pre-processed determination data received from the determination pre-processing unit 160. Therefore, the display processing unit 190 can display which range each of the pre-processed learning data determined to be normal, the pre-processed learning data determined to be abnormal, and the pre-processed determination data are distributed on the coordinate space for which the measurement values of each sensor having a high degree of contribution to the determination result are selected as the coordinate axes.

At S360, the designation input unit 175 inputs, from the user of the determination apparatus 150, an instruction to change the pre-processing parameter such as the type of pre-processing that should be applied to the measurement data in the determination data. When there is an instruction to change the type of pre-processing or the like, the determination apparatus 150 proceeds to the processing of S330, and performs the processings for applying the changed pre-processing on the determination data (S330), and for re-displaying the distribution of the measurement values in the pre-processed learning data and the pre-processed determination data (S340 to S350). When there is no instruction to change the type of pre-processing or the like, the determining unit 180 determines the state of the facility from the pre-processed determination data of the determination pre-processing unit 160, by using the learned model stored in the model storage unit 140 (S370).

Figure 4:
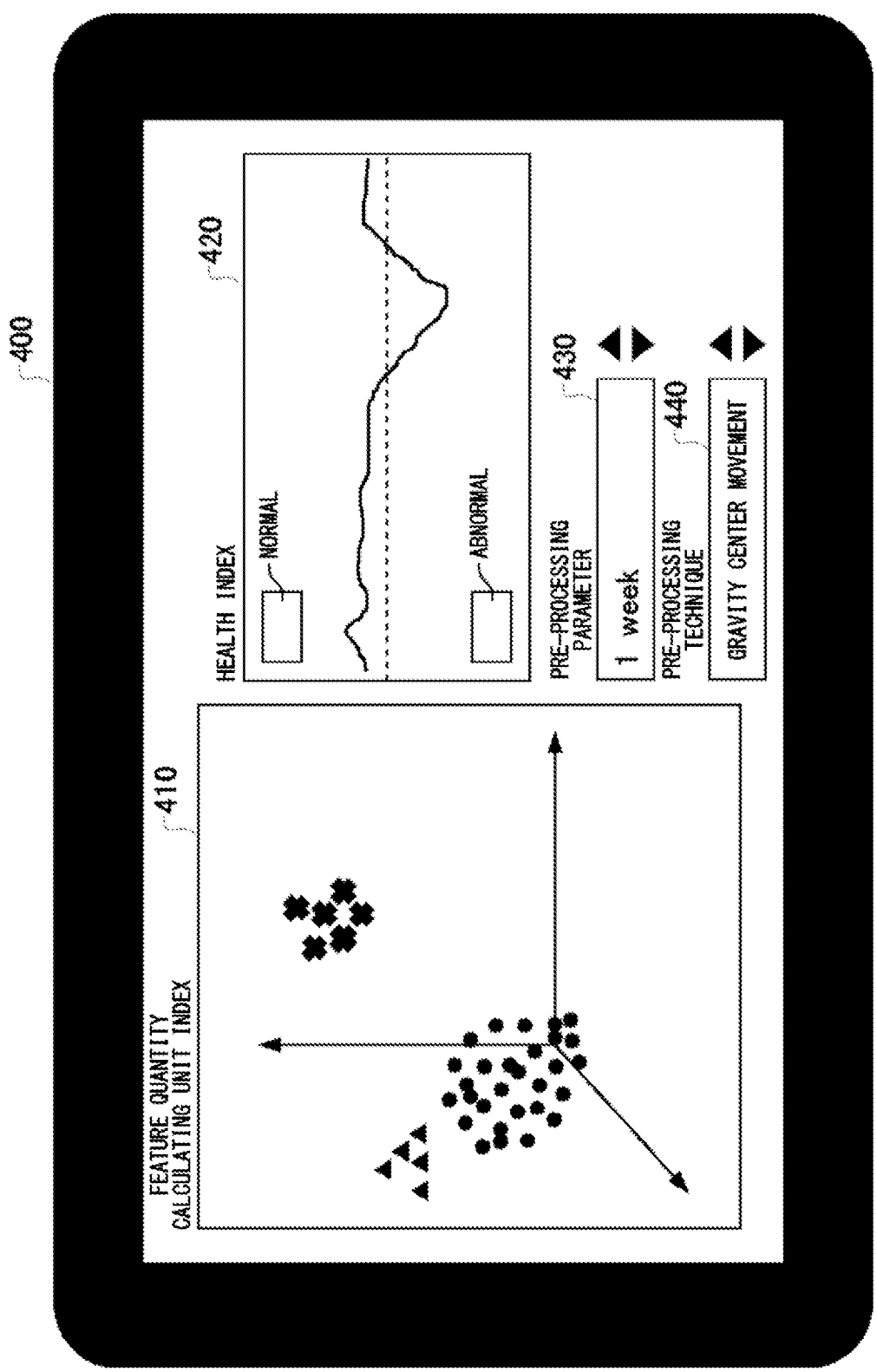
FIG. 4 shows one example of a display screen according to an embodiment of the present invention.

FIG. 4 shows one example of a display screen 400 according to the present embodiment. The display screen 400 includes a distribution display unit 410, a health display unit 420, a pre-processing parameter input unit 430, and a pre-processing technique input unit 440.

The distribution display unit 410 may be configured to display a distribution of the measurement values of the at least one sensor selected by the selecting unit 185 among the pre-processed learning data and the pre-processed determination data. In the example of this figure, the selecting unit 185 selects measurement values of three sensors having a relatively high degree of contribution to the determination result of the model. Herein, when a change of the measurement values of a certain sensor has a high degree of influence on the determination result of the model, the selecting unit 185 may determine that the degree of contribution of the measurement values of the sensor to the determination result is high. For example, in the SVM, the selecting unit 185 may select a predetermined number of elements (for example, two in a two dimensional display and three in a three dimensional display) in order of largeness of its absolute value among each element of the weight vector representing the hyperplane indicating the boundary of the determination result, and select the measurement values of the sensor corresponding to the selected elements as the ones that have a relatively high degree of contribution. Moreover, in the neural network, when a function from each input node for inputting the measurement values of each sensor to an output node for outputting the determination result is expanded, the selecting unit 185 may select a predetermined number of sensors in order of largeness of the influence on the output value.

The display processing unit 190 according to the present embodiment displays a distribution of the pre-processed learning data and the pre-processed determination data in a three dimensional space having the measurement values of selected three sensors as three axis directions, on the distribution display unit 410 as a three dimensional scatter diagram. In this figure, a circle mark indicates each sample of the pre-processed learning data classified as normal, an X mark indicates each sample of the pre-processed learning data classified as abnormal, and a triangle mark indicates each sample of the pre-processed determination data.

In this figure, the distribution of the pre-processed determination data (the triangle marks in the figure) is offset from the distribution of the pre-processed learning data classified as normal (the circle marks in the figure), on the three dimensional coordinate space. Herein, when the drift of the measurement data is successfully removed, the distribution of the pre-processed determination data should overlap the distribution of the pre-processed learning data. Therefore, when the distribution of the pre-processed determination data is offset from the distribution of the pre-processed learning data as in this figure, the display processing unit 190 can cause the user to recognize that the drift of the determination data is not sufficiently removed, and can cause the user to take an action such as to remove the drift of the determination data by means of changing the type of pre-processing at the S360 in FIG. 3, or the like. Moreover, the display processing unit 190 can cause the user to confirm whether an incorrect determination by the determining unit 180 has occurred due to the remaining drift, by displaying the distribution display unit 410 on the display screen 400.

The health display unit 420 displays time series data of a health index value indicating the determination result of the state of the plant determined by the determining unit 180 based on the pre-processed determination data using the learned model. The display processing unit 190 causes the determination result of each timing obtained by providing the pre-processed determination data at each timing to the model to be displayed as a time series graph. In a case where the SVM is used, the display processing unit 190 may display the sum of products of the measurement values of each sensor at each timing and the weight corresponding to each sensor as the health index value. In a case where the neural network is used, the display processing unit 190 may display, as the health index value, an output value of the output node for outputting the determination result when the measurement values of each sensor is inputted to the input layer. In the figure, the dashed line on the health display unit 420 indicates a threshold for determining normality and abnormality for the health index value. The determining unit 180 determines that the determination target facility in the plant is abnormal in response to the health index value becoming equal to or lower than the threshold.

The pre-processing parameter input unit 430 is an entry field displayed by the display processing unit 190 for accepting a designation of a pre-processing parameter from the user. Moreover, the pre-processing technique input unit 440 is an entry field displayed by the display processing unit 190 for accepting a designation of the type of pre-processing from the user. In this figure, the designation input unit 125 and the designation input unit 175 receives the type of pre-processing and other parameters for the pre-processing through an input from the user to the pre-processing parameter input unit 430 and the pre-processing technique input unit 440. In the example of this figure, at the pre-processing technique input unit 440, it is designated to use the "gravity center movement" as the pre-processing technique, and, at the pre-processing parameter input unit 430, "one week" is designated as the pre-processing parameter. According to this, the designation input unit 125 and the designation input unit 175 set the learning pre-processing unit 110 and the learning pre-processing unit 160 to reduce the drift in which the gravity center of the measurement data moves and to fix the length of the window as one week. The learning pre-processing unit 110 and the learning pre-processing unit 160 may perform at least one of the pre-processing for reducing the gravity center movement of the measurement data or the pre-processing for calculating the difference of the measurement data within the sliding window, according to the designation to the pre-processing parameter input unit 430 and the pre-processing technique input unit 440.

The display screen 400 as described above can cause the user to confirm whether the drift of the measurement data is successfully removed, by the display of the distribution display unit 410. Moreover, when the drift is not successfully removed, the designation input unit 125 and the designation input unit 175 can received a designation of an appropriate pre-processing from the user via the pre-processing parameter input unit 430 and the pre-processing technique input unit 440. Moreover, when the user who saw the display of the health display unit 420 concludes that the determination by the determination apparatus 150 is incorrect, the determination apparatus 150 may supply the learning data acquiring unit 105 with a set of the measurement data at the timing of the incorrect determination and the correct state of the determination target facility as additional learning data, and cause them to be used for re-learning of the model. In this case, the determination apparatus 150 may send an instruction to perform the processing from S200 in FIG. 2 to the learning apparatus 100, and the learning apparatus 100 may perform the re-learning processing from S200 in FIG. 2 based on this instruction.

Note that, when the feature quantity calculating unit 115 has a function for performing at least one of the undersampling or the oversampling of the learning data, the display processing unit 190 may display at least one of an entry field of a designation of whether to apply the undersampling/oversampling, an entry field of a designation of the rate of the undersampling/oversampling, or an entry field for designating another parameter of the undersampling/oversampling. In this case, the designation input unit 125 may input a designation related to the undersampling/oversampling, and the feature quantity calculating unit 115 may perform the undersampling/oversampling of the learning data based on this designation.

Figure 5:
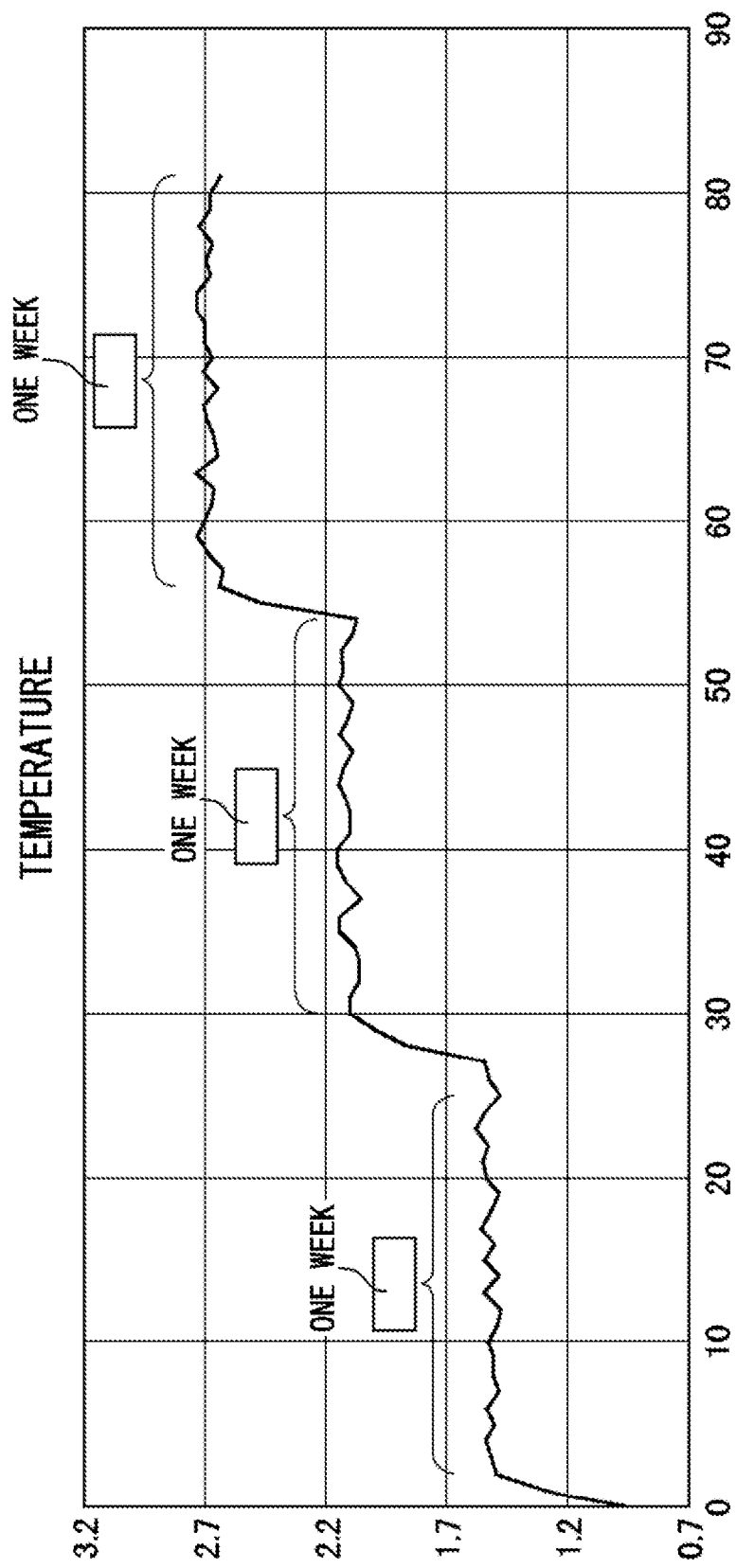
FIG. 5 shows one example of measurement data according to an embodiment of the present invention.
Figure 6:
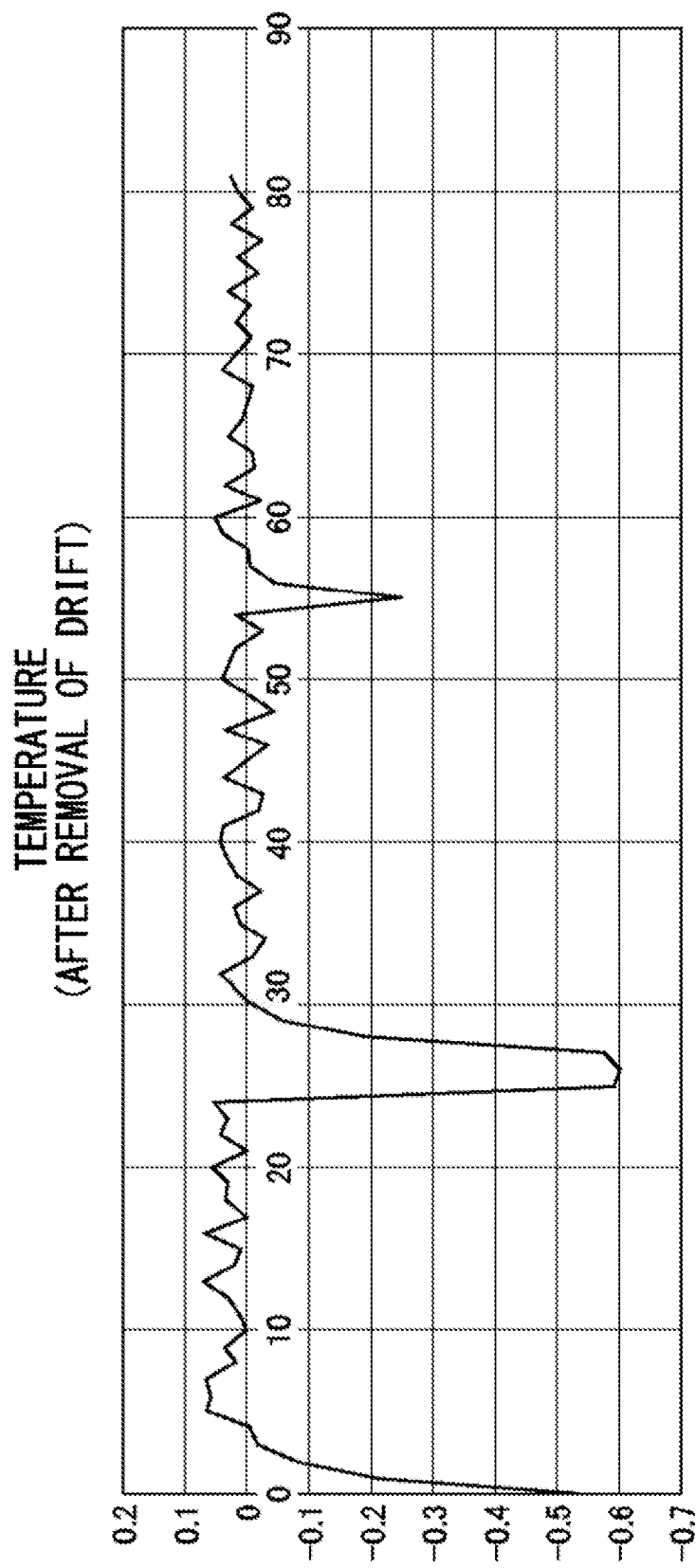
FIG. 6 shows one example of measurement data after drift removal according to an embodiment of the present invention.

FIG. 5 shows one example of the measurement data according to the present embodiment, and FIG. 6 shows one example of the measurement data after drift removal according to the present embodiment. Each of the horizontal axes in these figures indicates the lapse of time, and each of the vertical axes indicates measurement values.

In the example of this figure, the measurement data is time series data of measurement values of a temperature sensor for measuring a temperature at the measuring point. In the measurement data, as shown in FIG. 5, a drift in which the gravity center moves every one week has occurred.

The feature quantity calculating unit 115 is configured to calculate, in response to receiving the learning data including such measurement data, a gravity center for each sliding window and a cycle in which the gravity center changes (in the example of this figure, one week) as the feature quantity representing the drift in the measurement data. Instead, the designation input unit 125 may receive the pre-processing technique (in FIG. 4, "gravity center movement") and the pre-processing parameter (in FIG. 4, "one week") designated by the user, via the input to the pre-processing parameter input unit 430 and the pre-processing technique input unit 440 in FIG. 4. In this case, the feature quantity calculating unit 115 calculates the above described feature quantity according to the designated pre-processing technique and pre-processing parameter.

The data converting unit 120 may perform, in each section obtained by dividing the measurement data for each cycle as above described (in the example of this figure, one week), a pre-processing for subtracting a value of the gravity center of the section from the measurement data, according to the feature quantity calculated by the feature quantity calculating unit 115. Thus, the data converting unit 120 can obtain the measurement data from which the influence of the cyclic drift is removed as shown in FIG. 6. The learning processing unit 130 can learn a model by using the pre-processed learning data including the measurement data from which the influence of the drift is thus removed. Note that, when the drift of the measurement data is removed by using the mean, the gravity center, or the like of each section obtained by dividing the measurement data for each certain cycle, discontinuous points may occur as shown in FIG. 6 around the timings 24 to 29 and around the timings 55 to 57 at the boundaries between the sections. Thus, the learning processing unit 130 may not use the measurement values during a predetermined margin period after switching of the sections for the learning.

Moreover, at the determination phase based on the determination data, the determination apparatus 150 may handle the measurement data in a similar way to the learning phase described above. That is, the feature quantity calculating unit 165 is configured to calculate the gravity center for each sliding window and a cycle in which the gravity center changes as the feature quantity representing the drift of the measurement data, in response to receiving the determination data including such measurement data as in FIG. 5. Instead, the designation input unit 175 may receive the pre-processing technique and the pre-processing parameter designated by the user, via the input to the pre-processing parameter input unit 430 and the pre-processing technique input unit 440 in FIG. 4. In this case, the feature quantity calculating unit 165 calculates the above described feature quantity according to the designated pre-processing technique and pre-processing parameter.

The data converting unit 170 may perform, in each section obtained by dividing the measurement data for each cycle as above described, a pre-processing for subtracting a value of the gravity center of the section from the measurement data, according to the feature quantity calculated by the feature quantity calculating unit 165. Thus, the data converting unit 170 can obtain the measurement data from which the influence of the cyclic drift is removed as shown in FIG. 6. The determining unit 180 can determine a state of the facility by using the pre-processed determination data including the measurement data from which the influence of the drift is thus removed. Note that the determining unit 180 may be configured not to use the measurement values during a predetermined margin period after switching of sections for the determination, in order to avoid discontinuous points as shown in FIG. 6 around the timings 24 to 29 and around the timings 55 to 57.

The learning apparatus 100 and the determination apparatus 150 as described above can learn a model so as not to be affected by the influence of the drift of the measurement data, and perform a diagnosis of a plant by using such model. Thus, the learning apparatus 100 and the determination apparatus 150 can reduce the need of re-learning the model, even when the feature of the measurement data changes with the lapse of time.

Moreover, because the learning apparatus 100 and the determination apparatus 150 can also receive a designation of the type of pre-processing or the like from the user and perform the designated pre-processing, the learning apparatus 100 and the determination apparatus 150 can be cable of changing the pre-processing according to an event known to the user, such as, for example, shutting down the plant or some of the facilities for a periodic maintenance, performing a calibration of the sensors, or changing the setting of the sensors or the devices for reading out the sensor data.

Moreover, the learning apparatus 100 and the determination apparatus 150 use a model from which the influence of the drift of the measurement data is excluded, and thus also make it possible to apply the model to a facility having the same or similar configuration in the same plant or different plants, without re-learning.

Note that, in the above description, an example is shown where one pre-processing is applied to the measurement data for convenience of description. Instead, the learning apparatus 100 and the determination apparatus 150 may be configured to perform different pre-processings to the measurement data from different sensors. For example, the learning apparatus 100 and the determination apparatus 150 may be configured to perform the gravity center movement processing in a cycle of every one week for the measurement data a from the sensors A1 to A3, the gravity center movement processing in a cycle of every 30 minutes for the measurement data b from the sensors B1 to B2, and the difference calculation processing using a sliding window having a length of one day for the measurement data c from the sensor C.

Moreover, in the above description, an example is shown where the selecting unit 185 and the display processing unit 190 are provided in the determination apparatus 150. Instead, the selecting unit 185 and the display processing unit 190 may be provided in the learning apparatus 100. Moreover, the learning apparatus 100 may be provided as an apparatus integrating the determination apparatus 150 or, to the contrary, the determination apparatus 150 may be provided as an apparatus integrating the learning apparatus 100. Moreover, at least one of the learning apparatus 100 or the determination apparatus 150 may be implemented by cloud computing.

Various embodiments of the present invention may be described with reference to flowcharts and block diagrams whose blocks may represent (1) steps of processes in which operations are performed or (2) sections of devices responsible for performing operations. Certain steps and sections may be implemented by dedicated circuitry, programmable circuitry supplied with computer readable instructions stored on computer readable media, and/or processors supplied with computer readable instructions stored on computer readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer readable media may include any tangible device that can store instructions for execution by a suitable device, such that the computer readable medium having instructions stored therein comprises an article of manufacture including instructions which can be executed to create means for performing operations specified in the flowcharts or block diagrams. Examples of computer readable media may include an electronic storage medium, a magnetic storage medium, an optical storage medium, an electromagnetic storage medium, a semiconductor storage medium, etc. More specific examples of computer readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), a wide area network (WAN) such as the Internet, etc., to execute the computer readable instructions to create means for performing operations specified in the flowcharts or block diagrams. Examples of processors include computer processors, processing units, microprocessors, digital signal processors, controllers, microcontrollers, etc.

Figure 7:
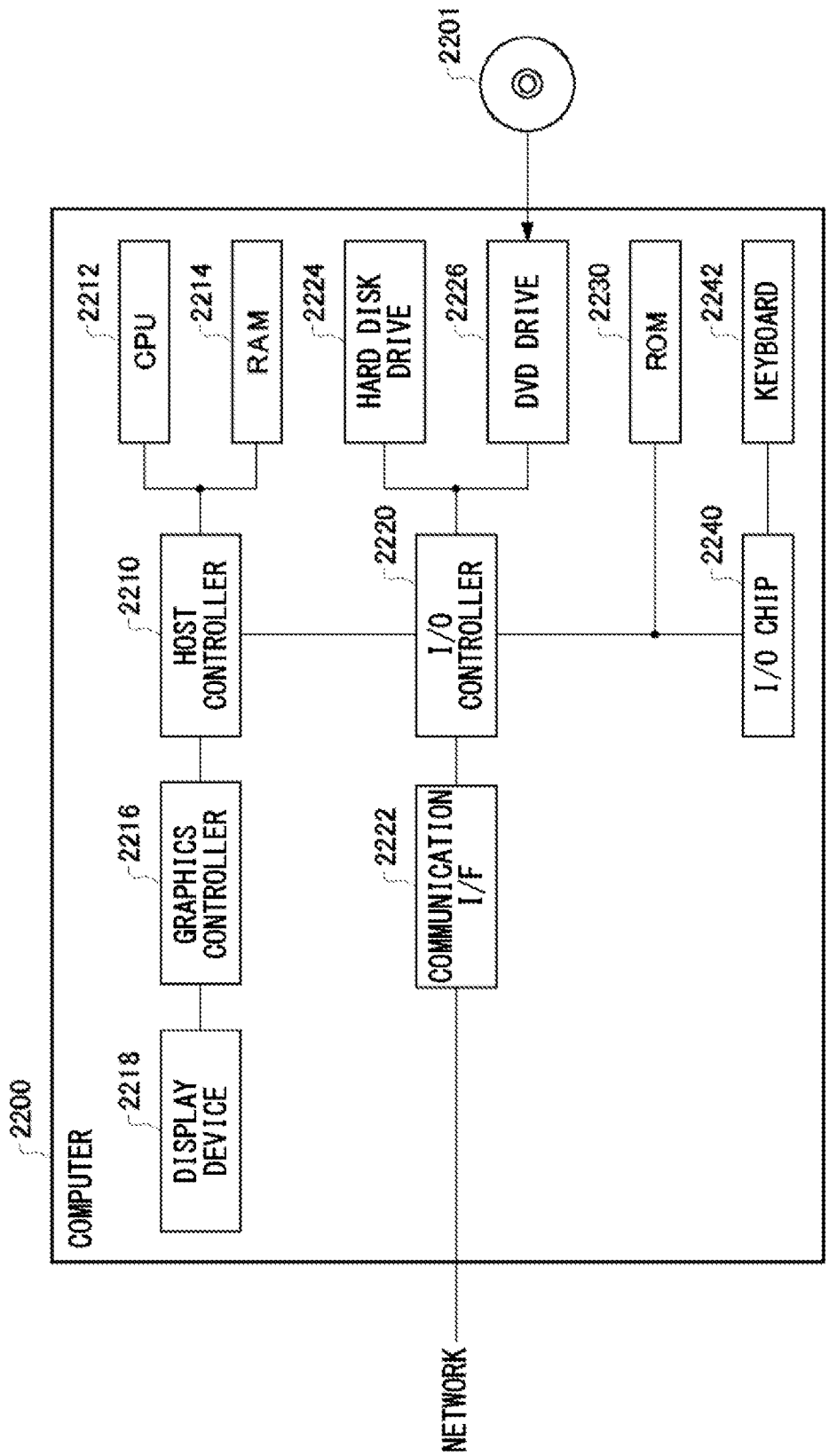
FIG. 7 shows an example of a computer 2200 in which aspects of the present invention may be wholly or partly embodied.

FIG. 7 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and sends the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims for convenience, embodiments, or diagrams, it does not necessarily mean that the process must be performed in this order.

What is claimed is:

1. A learning apparatus comprising:
   a learning data acquiring unit for acquiring learning data including measurement data obtained by measuring a facility and a state of the facility;
   a learning pre-processing unit for performing a pre-processing for reducing a drift of the measurement data in the learning data and outputting pre-processed learning data; and
   a learning processing unit for performing a processing for learning a model for determining the state of the facility from the pre-processed measurement data, by using the pre-processed learning data,
   wherein the learning pre-processing unit comprises:
      a feature quantity calculating unit for calculating a feature quantity representing the drift of the measurement data in the learning data, and
      a data converting unit for removing the drift according to the feature quantity from the measurement data in the learning data.

2. The learning apparatus according to claim 1, further comprising a designation input unit for inputting a designation of a type of pre-processing that the learning pre-processing unit should perform,
   wherein the learning pre-processing unit is configured to perform a pre-processing corresponding to the inputted designation.

3. The learning apparatus according to claim 2, wherein the learning pre-processing unit is configured to perform, according to the designation, at least one of a pre-processing for reducing a gravity center movement of the measurement data in the learning data or a pre-processing for calculating the difference of the measurement data in the learning data within a sliding window.

4. The learning apparatus according to claim 1, further comprising:
   a determination data acquiring unit for acquiring determination data including measurement data obtained by measuring the facility;
   a determination pre-processing unit for performing a pre-processing for reducing a drift of the determination data and outputting pre-processed determination data; and
   a determining unit for determining the state of the facility from the pre-processed determination data by using the model learned.

5. The learning apparatus according to claim 4, further comprising a display processing unit for performing a processing for displaying a distribution of the pre-processed learning data and the pre-processed determination data.

6. The learning apparatus according to claim 5,
   wherein the learning data and the determination data include measurement values of a plurality of sensors provided in the facility,
   wherein the learning apparatus further comprises a selecting unit for selecting measurement values of at least one sensor having a relatively high degree of contribution to a determination result of the model among the measurement values of the plurality of sensors,
   wherein the display processing unit is configured to perform a processing for displaying a distribution of the measurement values of the at least one sensor selected by the selecting unit among the pre-processed learning data and the pre-processed determination data.

7. A learning method comprising:
   by a learning apparatus, acquiring learning data including measurement data obtained by measuring a facility and a state of the facility;
   by the learning apparatus, performing a pre-processing for reducing a drift of the measurement data in the learning data and outputting pre-processed learning data; and
   by the learning apparatus, performing a processing for learning a model for determining the state of the facility from the pre-processed measurement data, by using the pre-processed learning data,
   wherein performing the processing for learning the model comprises:
      calculating a feature quantity representing the drift of the measurement data in the learning data, and
      removing the drift according to the feature quantity from the measurement data in the learning data.

8. The learning method according to claim 7, further comprising, by the learning apparatus, inputting a designation of a type of pre-processing that should be performed in outputting the pre-processed learning data,
   wherein outputting the pre-processed learning data includes performing a pre-processing corresponding to the inputted designation.

9. The learning method according to claim 8, wherein outputting the pre-processed learning data includes performing, according to the designation, at least one of a pre-processing for reducing a gravity center movement of the measurement data in the learning data or a pre-processing for calculating the difference of the measurement data in the learning data within a sliding window.

10. A non-transitory computer readable medium containing computer instructions stored therein for causing at least one processor to perform steps of a learning program that causes the at least one processor to function as a learning apparatus comprising:
    a learning data acquiring unit for acquiring learning data including measurement data obtained by measuring a facility and a state of the facility;
    a learning pre-processing unit for performing a pre-processing for reducing a drift of the measurement data in the learning data and outputting pre-processed learning data; and
    a learning processing unit for performing a processing for learning a model for determining the state of the facility from the pre-processed measurement data, by using the pre-processed learning data,
    wherein the learning pre-processing unit comprises:

a feature quantity calculating unit for calculating a feature quantity representing the drift of the measurement data in the learning data, and a data converting unit for removing the drift according to the feature quantity from the measurement data in the learning data.

11. A determination apparatus comprising:

a determination data acquiring unit for acquiring determination data including measurement data obtained by measuring a facility;

a determination pre-processing unit for performing a pre-processing for reducing a drift of the determination data and outputting pre-processed determination data; and a determining unit for determining a state of the facility from the pre-processed determination data, by using a model learned by using pre-processed learning data obtained by performing a pre-processing on learning data; and a selecting unit for selecting measurement values of at least one sensor having a relatively high degree of contribution to a determination result of the model among the measurement values of a plurality of sensors provided in the facility.

12. The determination apparatus according to claim 11, further comprising a display processing unit for performing a processing for displaying a distribution of the pre-processed learning data and the pre-processed determination data.

13. The determination apparatus according to claim 12, wherein the learning data and the determination data include measurement values of the plurality of sensors, and wherein the display processing unit is configured to perform a processing for displaying a distribution of the measurement values of the at least one sensor selected by the selecting unit among the pre-processed learning data and the pre-processed determination data.

14. A determination method comprising:

by a determination apparatus, acquiring determination data including measurement data obtained by measuring a facility;

by the determination apparatus, performing a pre-processing for reducing a drift of the determination data and outputting pre-processed determination data;

by the determination apparatus, determining a state of the facility from the pre-processed determination data, by using a model learned by using pre-processed learning data obtained by performing a pre-processing on learning data; and by the determination apparatus, selecting measurement values of at least one sensor having a relatively high degree of contribution to a determination result of the model among the measurement values of a plurality of sensors provided in the facility.

15. The determination method according to claim 14, further comprising, by the determination apparatus, performing a processing for displaying a distribution of the pre-processed learning data and the pre-processed determination data.

16. The determination method according to claim 15, wherein the learning data and the determination data include measurement values of the plurality of sensors, and wherein performing the processing for displaying includes performing a processing for displaying a distribution of the measurement values of the at least one sensor selected by the selecting unit among the pre-processed learning data and the pre-processed determination data.

17. A non-transitory computer readable medium containing computer instructions stored therein for causing at least one processor to perform the steps of a determination program that causes the at least one processor to function as:

a determination data acquiring unit for acquiring determination data including measurement data obtained by measuring a facility;

a determination pre-processing unit for performing a pre-processing for reducing a drift of the determination data and outputting pre-processed determination data; and a determining unit for determining a state of the facility from the pre-processed determination data, by using a model learned by using pre-processed learning data obtained by performing a pre-processing on learning data; and a selecting unit for selecting measurement values of at least one sensor having a relatively high degree of contribution to a determination result of the model among the measurement values of a plurality of sensors provided in the facility.

* * * * *